United States Patent
Mukherji et al.

(10) Patent No.: US 10,499,197 B1
(45) Date of Patent: Dec. 3, 2019

(54) BENCHMARKING AND MEASUREMENT OF LOCATION ACCURACY USING CROWDSOURCED DATA

(71) Applicant: Cisco Technology, Inc., San Jose, CA (US)

(72) Inventors: Abhishek Mukherji, Milpitas, CA (US); Huy Phuong Tran, Portland, OR (US); Rong Peng, Los Altos, CA (US); Santosh Ghanshyam Pandey, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/181,906

(22) Filed: Nov. 6, 2018

(51) Int. Cl.
*H04W 4/029* (2018.01)
*H04W 16/24* (2009.01)
*H04W 84/12* (2009.01)

(52) U.S. Cl.
CPC .......... *H04W 4/029* (2018.02); *H04W 16/24* (2013.01); *H04W 84/12* (2013.01)

(58) Field of Classification Search
CPC ..... H04W 4/029; H04W 16/24; H04W 84/12; H04W 4/33; H04W 16/02
See application file for complete search history.

(56) References Cited

U.S. PATENT DOCUMENTS

| | | | | |
|---|---|---|---|---|
| 2011/0087431 A1* | 4/2011 | Gupta | .................. | G01S 5/0018 701/408 |
| 2013/0021199 A1* | 1/2013 | Fix | .......................... | G01S 5/021 342/357.43 |
| 2013/0267257 A1* | 10/2013 | Palanki | ................. | H04W 4/029 455/456.5 |
| 2015/0084766 A1* | 3/2015 | Cordaro | ............... | H04W 28/04 340/521 |

OTHER PUBLICATIONS

A. Mariakakis, S. Sen, J. Lee, and K. Kim. SAIL: single access point-based indoor localization. In the 12th Annual International Conference on Mobile Systems, Applications, and Services, MobiSys 14, Bretton Woods, NH, USA, Jun. 16-19, 2014, pp. 315-328, 2014.

(Continued)

*Primary Examiner* — Said M Elnoubi
(74) *Attorney, Agent, or Firm* — Merchant & Gould P.C.

(57) ABSTRACT

It may be determined that each of a first plurality of devices was stationary at a location based on received first location information. Next, a first estimated ground truth may be determined for each of the first plurality of devices at the location based on the first location information corresponding to each of the respective first plurality of devices at the location. A first plurality of location estimation errors may then be determined for each of the first plurality of devices at the location respectively based on the first location information corresponding to each of the respective first plurality of devices at the location and the first estimated ground truth for each of the respective first plurality of devices at the location. Next, each of the determined first plurality of location estimation errors for each of the first plurality of devices at the location may be aggregated to provide a first location accuracy measurement for the location.

17 Claims, 5 Drawing Sheets

(56) References Cited

OTHER PUBLICATIONS

K. Kavitha Muthukrishnan, B. van der Zwaag, and P. Having a Inferring motion and location using WLAN RSSI, pp. 163-182. Lecture Notes in Computer Science. Springer Verlag, 9 2009.

K. Muthukrishnan, M. Lijding, N. Meratnia, and P. Havinga. Sensing Motion Using Spectral and Spatial Analysis of WLAN RSSI Proceeding EuroSSC'07 Proceedings of the 2nd European conference on Smart sensing and context, pp. 62-76.

J. Krumm and E. Horvitz. Locadio: Inferring Motion and Location from Wi-Fi Signal Strengths. In The First Annual International Conference on Mobile and Ubiquitous Systems: Networking and Services, 2004. MOBIQUITOUS 2004, pp. 4-13, Aug. 2004.

B. Kusy, A. Ledeczi, and X. Koutsoukos. Tracking mobile nodes using rf doppler shifts. In Proceedings of the 5th international conference on Embedded networked sensor systems, pp. 29-42. ACM, 2007.

C. Wu, Z. Yang, Z. Zhou, X. Liu, Y. Liu, and J. Cao. Non-invasive detection of moving and stationary human with wifi. IEEE Journal on Selected Areas in Communications,33(11):2329-2342, Nov. 2015.

O. Rukundo and H. Cao. Nearest neighbor value interpolation International Journal of Advanced Computer Science and Applications(IJACSA),3(4), 2012: 25-30.

* cited by examiner

BENCHMARKING AND MEASUREMENT OF LOCATION ACCURACY USING CROWDSOURCED DATA

TECHNICAL FIELD

The present disclosure relates generally to benchmarking and measurement of location accuracy.

BACKGROUND

In computer networking, a wireless access point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a wireless local area network (WLAN) controller. An AP is differentiated from a hotspot, which is the physical location where Wi-Fi access to a WLAN is available.

Prior to wireless networks, setting up a computer network in a business, home or school often required running many cables through walls and ceilings in order to deliver network access to all of the network-enabled devices in the building. With the creation of the wireless access point, network users are able to add devices that access the network with few or no cables. An AP normally connects directly to a wired Ethernet connection and the WAP then provides wireless connections using radio frequency links for other devices to utilize that wired connection. Most APs support the connection of multiple wireless devices to one wired connection. Modern APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

It may be determined that each of a first plurality of devices was stationary at a location based on received first location information. Next, a first estimated ground truth may be determined for each of the first plurality of devices at the location based on the first location information corresponding to each of the respective first plurality of devices at the location. A first plurality of location estimation errors may then be determined for each of the first plurality of devices at the location respectively based on the first location information corresponding to each of the respective first plurality of devices at the location and the first estimated ground truth for each of the respective first plurality of devices at the location. Next, each of the determined first plurality of location estimation errors for each of the first plurality of devices at the location may be aggregated to provide a first location accuracy measurement for the location.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

An indoor positioning system may track the indoor position of devices and assets utilizing, for example, a combination of Bluetooth beacons, Wi-Fi, and other processes. For determining the capability of an indoor positioning system, one key parameter may comprise "accuracy" that may be determined for each deployment. Accuracy, for example, may be defined as the Euclidean distance (e.g., error) between an estimated location of a device and its ground truth location for both stationary and moving devices. With conventional indoor positioning systems, a multi-point accuracy test must be performed on each deployment floor in order to determine if the indoor positioning system accuracy conforms to a desired accuracy. With conventional systems, this may mean a person may need to be physically present at a site of the indoor positioning system's installation and perform accuracy testing for multiple devices. The conventional process includes marking a current device position (i.e., a ground truth location ($x\_gt, y\_gt$)) on a map, running and collecting location computation data, and comparing a predicted output location ($x\_cmx, y\_cmx$) with the ground truth. The distance between ($x\_gt, y\_gt$) and ($x\_cmx, y\_cmx$) may comprise an estimation error. A desired accuracy may comprise a certain error distance.

Conventional processes have many drawbacks. First, conventional accuracy processes require a person to be physically present at a premises with multiple devices of different types (e.g., iOS, Android, etc.). Second, tests done at different spots cannot be compared. When accuracy tests are repeated, a same set of points must be tested to establish a benchmark and verify if/how the retest compares to the accuracy achieved earlier. Third, the same set of devices must be employed for the repeated tests as different devices may yield different accuracy that may not be compared to prior tests. For example, even results for different manufactures' devices may differ across devices offered by the manufacturers and between manufacturers. The purpose is to figure out the accuracy for different device types, operating systems, and sensors in the tracked devices. With a fourth drawback, the multi-point tests are for a hand-picked finite number of spots (i.e., 10-15 locations) on a floor map and cannot potentially cover the complete floor map. Thus accuracy is not representative of the whole floor map, but for only an aggregate over the tested locations. And fifth, it is cumbersome to perform the tests again and again as the devices and a person must physically visit the site to do the repeated tests.

Embodiments of the disclosure may overcome the above limitations of conventional accuracy testing processes. Embodiments of the disclosure may establish an accuracy measurement for an overall floor map, irrespective of the device type. Moreover, embodiments of the disclosure may not require the cumbersome process of a person performing the tests by physically placing the devices on the site floor map. Furthermore, embodiments of the disclosure may help with repeatability and continuous monitoring of the indoor positioning system accuracy health without human effort. In addition, embodiments of the disclosure may benchmark and monitor the location computation accuracy indexes week after week, for example.

Figure 1A:
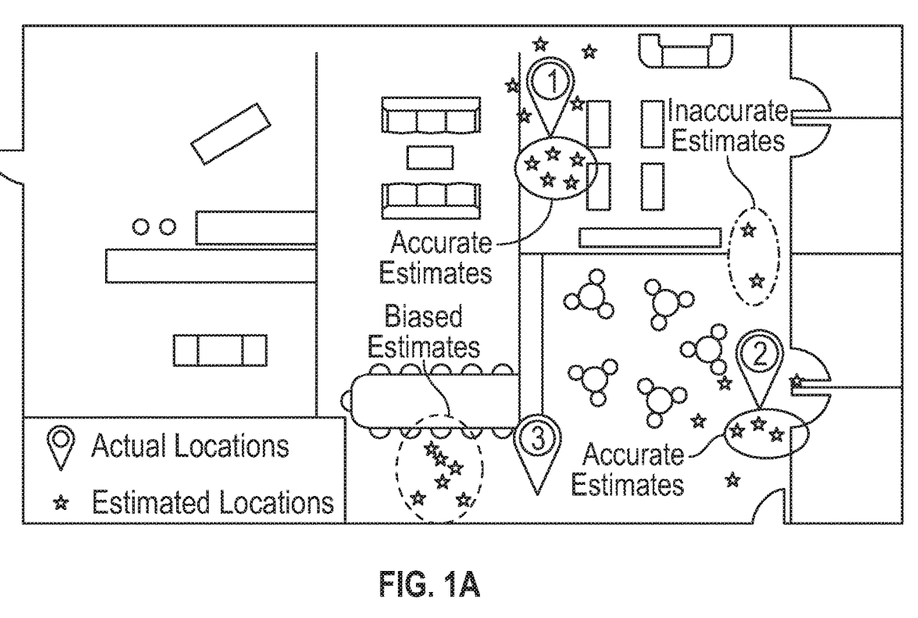
FIG. 1A and FIG. 1B illustrate location estimates.
Figure 1B:
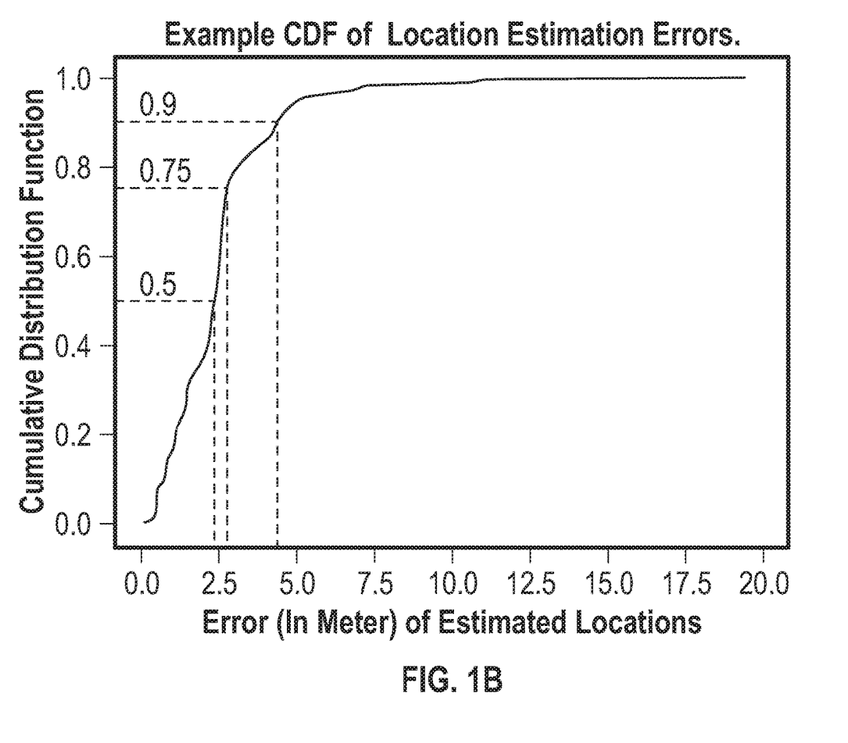

FIG. 1A and FIG. 1B illustrate location estimates around actual device (ground truth) locations. As shown in FIG. 1A and FIG. 1B, determining a Cumulative Distribution Function (CDF) with different statistics (e.g., average, and 50, 75, and 90 percentiles) from the estimates is a way of representing accuracy as depicted in FIG. 1B. FIG. 1A shows accurate estimates (close to ground truth) and inaccurate estimates (far from ground truth).

Figure 2:
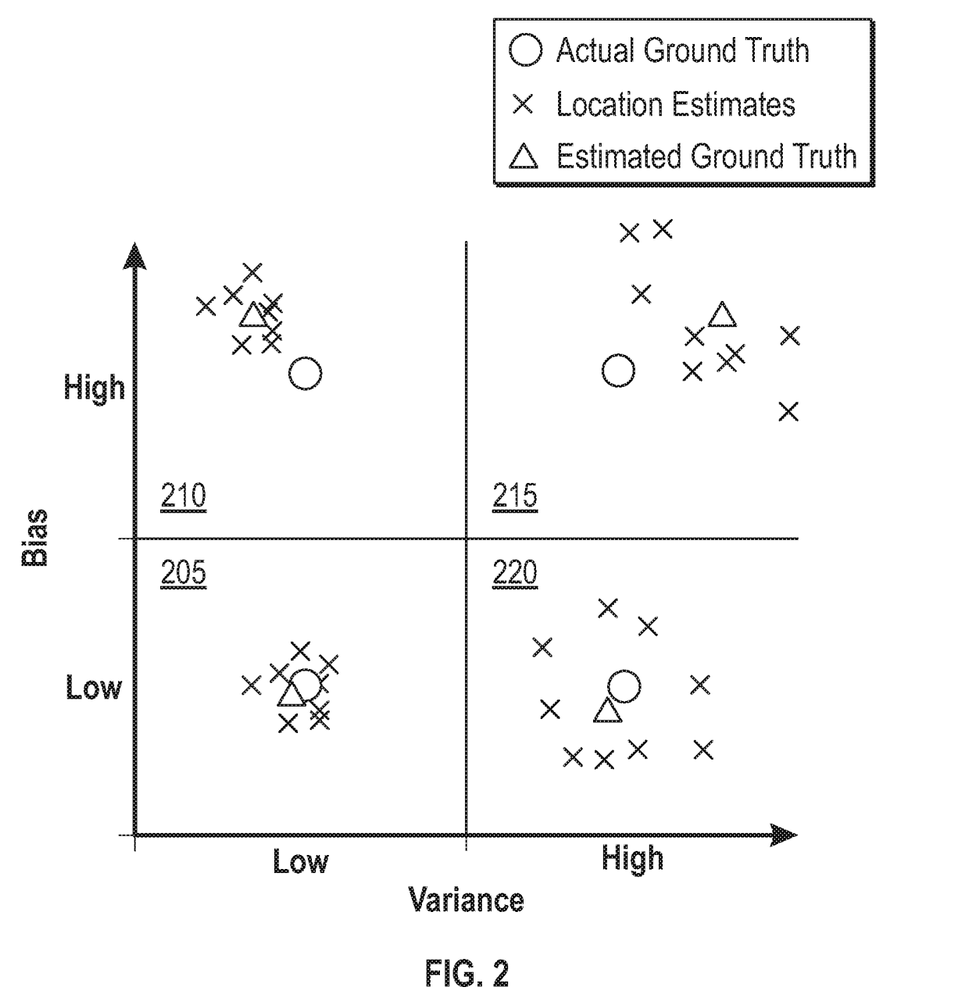
FIG. 2 illustrates bias and variance.

FIG. 2 illustrates bias and variance. Biased estimates may comprise those concentrated on one side of the ground truth rather than being uniformly distributed around the ground truth. Such bias can happen due to several reasons, such as uneven distribution of nearby access points.

In an indoor positioning system deployment, two problems that can be observed with respect to the distribution of location estimation may comprise: i) bias; and ii) variance. As shown in FIG. 2, high bias may be a greater problem than high variance as centroid/aggregate over a purely high variance estimates may still yield an accurate estimate. Thus, embodiments of the disclosure may focus on identifying and remediation of high bias. Once high bias areas are identified, numerous approaches can be employed to rectify them. For example, tuning the APs (e.g., TxPower, path loss model), and adjusting positions of few APs around the high bias area. The overall goal may be to identify and eliminate high bias areas. In other words, low bias should be maintained across the indoor positioning system deployment.

In conventional processes, as described above, the accuracy at any deployment is determined by extensive manual efforts of conducting accuracy tests. With conventional systems, there may be no way to validate that the accuracy is consistent over time. Any deterioration in location accuracy with conventional systems will go unnoticed until the next manual accuracy testing is performed and customer use cases based on accurate location would fail. Embodiments of the disclosure may automate the location accuracy process of the indoor positioning system. In this context, two aspects of location accuracy may be addressed by embodiments of the disclosure: i) coverage; and ii) consistency.

Coverage may refer to how accuracy varies over deployment space and time. Similar to Wi-Fi coverage, location accuracy coverage can vary in different areas and over time due to numerous factors such as RF interference and lack of line-of-sight. Consistency, which extends coverage, may determine the repeatability of the accuracy coverage over time. Location accuracy coverage across a floor map and monitoring consistency may comprise key requirements of an enterprise indoor positioning systems. It may be important that accuracy is achieved throughout the full deployment floor map. Furthermore, automatic consistency monitoring to establish if accuracy is maintained over time is desirable.

While a CDF (e.g., described above) may demonstrate the distribution of estimation errors, a heatmap may comprise a visual representation of accuracy throughout the full deployment floor map. A heatmap may depict the accuracy at different areas of the floor. The heatmap may be normalized by distance so a maximum value (e.g., 12 meters) maps to 1.0 and a minimum value (e.g., 0.5 meter) to 0.0. Different colors in a heatmap may depict the normalized accuracy levels, for example, red may mean normalized distance between 0.8 and 1.0, blue may mean normalized distance between 0.15 to 0.35, and so on.

As described above, to determine location accuracy coverage, conventional processes involve collecting large numbers of estimated location samples that are compared to their respective actual (i.e., ground truth) locations across the deployment. In other words, with conventional systems, the ground truth locations must be known to determine error of estimated location. Moreover, the evaluations in conventional systems must be repeated over time.

Figure 3:
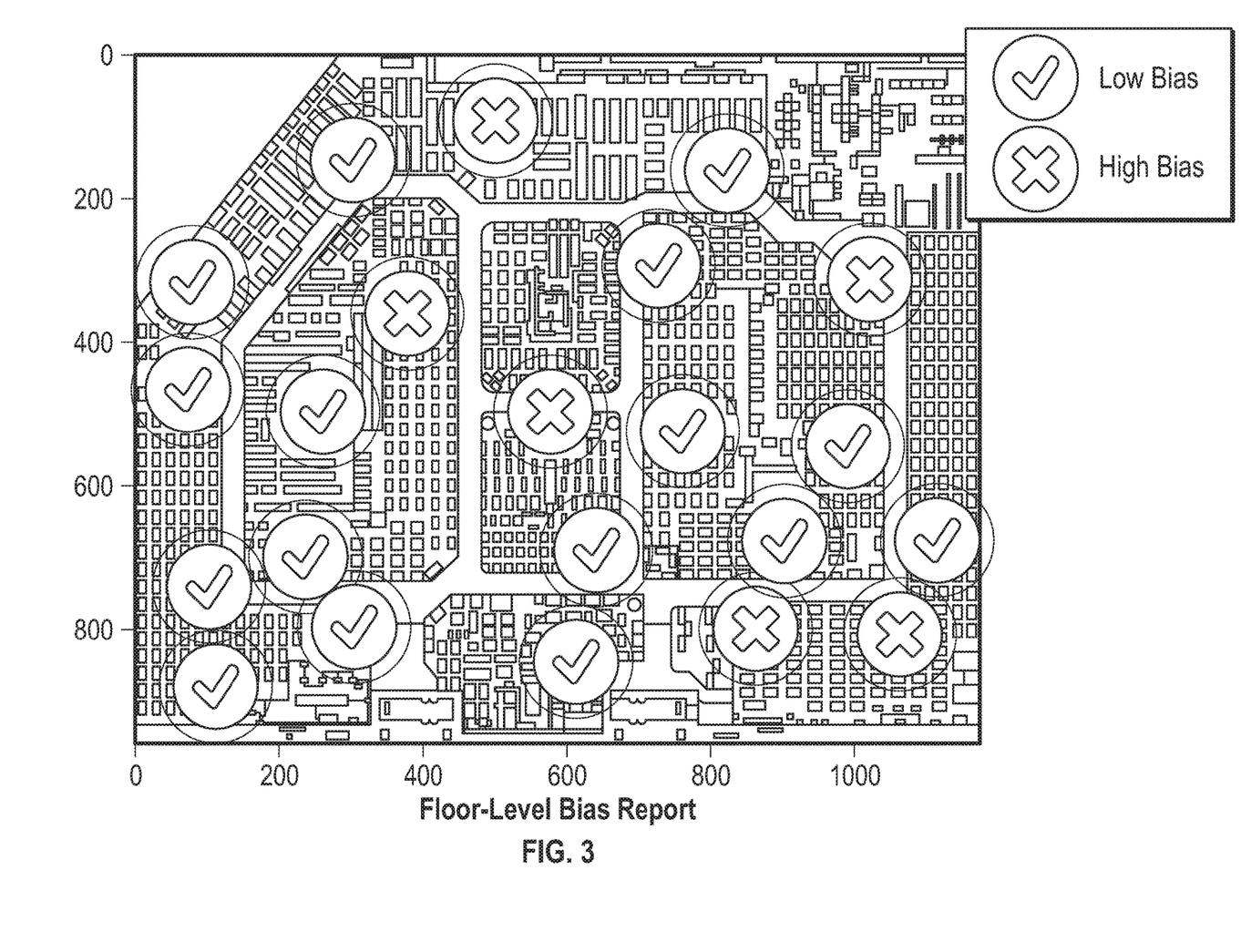
FIG. 3 illustrates a floor-level bias report.

FIG. 3 illustrates a floor-level bias report. Before applying the process as described below with respect to FIG. 4, it may first be determined that the location is considered a low bias location. Bias determination may include identifying areas of the deployment that have high bias and alerting with a comprehensive deployment bias report. Bias determination may comprise a one-time check for each deployment. This may be part of an initial location deployment checklist.

In order to identify deployment bias, multiple locations on the floor may be tested and the locations found to have high bias may be reported. The bias test may be automated by using some reference tags (e.g., devices with known locations such as Wi-Fi printers, workstations, etc.). Further, a smartphone that may leverage a Software Development Kit (SDK) to estimate location via a combination of Bluetooth Low Energy (BLE) and inertial sensors may be used to detect bias. The BLE and inertial sensor combination may give an accurate location. When the phone is stationary and location estimates by the SDK differs greatly from the indoor positioning system estimates, there may be high bias in that location. A significant number (e.g., 50+) of location estimates may be collected and if the estimates are unbalanced, it may be marked as a high bias location. The margin of distribution of location estimates may be measured in four quadrants to establish if there is high bias. The criteria for high bias may be, for example, <5% of the estimates in any two adjoining quadrants.

Figure 4:
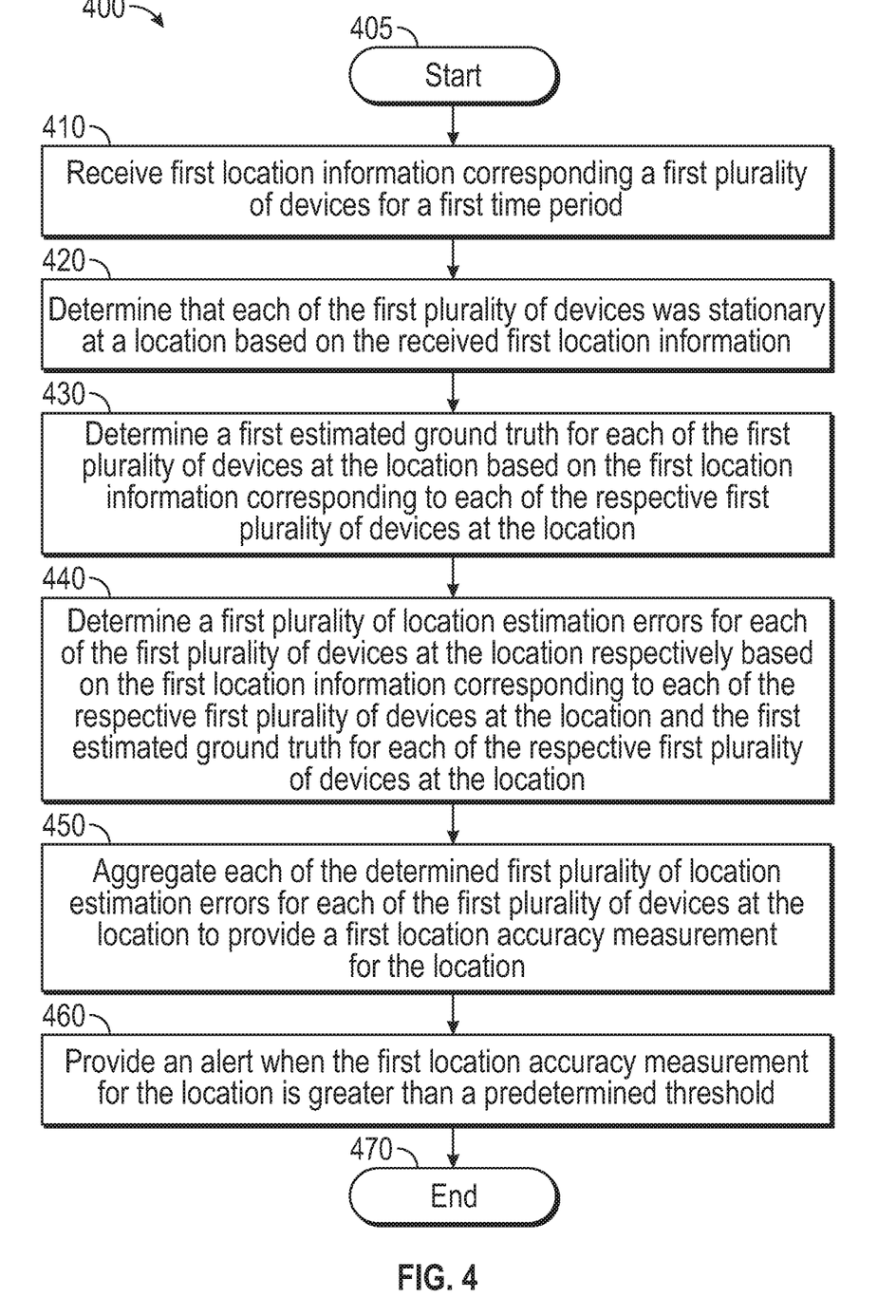
FIG. 4 is a flow chart of a method for providing benchmarking and measurement of location accuracy using crowdsourced data.

FIG. 4 is a flow chart setting forth the general stages involved in a method 400 consistent with an embodiment of the disclosure for providing benchmarking and measurement of location accuracy using crowdsourced data. Method 400 may be implemented using a computing device 500 as described in more detail below with respect to FIG. 5. Ways to implement the stages of method 400 will be described in greater detail below.

Method 400 may begin at starting block 405 and proceed to stage 410 where computing device 500 may receive first location information corresponding to a first plurality of devices for a first time period. For example, the first plurality of devices may be devices that may move around a floor covered by an indoor positioning system during the first time period. For each device, coordinates (e.g., (x,y) coordinates) of each of the devices may be collected periodically. These collected coordinates may comprise the first location information. For example, the first time period may comprise eight hours and the coordinates may be collected every 20 seconds for each device. The devices may comprise, but are not limited to, any mobile computing devices such as smart phones, tablet devices, notebook computers, and the like that may be moving about the floor and connected to the indoor positioning system of which computing device 500 may associated with.

From stage 410, where computing device 500 receives the first location information corresponding to the first plurality of devices for the first time period, method 400 may advance to stage 420 where computing device 500 may determine that each of the first plurality of devices was stationary at a location based on the received first location information. Computing device 500 may process the first location information to identify sufficiently long stationary durations of the first plurality of devices. For example, the first plurality of devices may comprise a first device, a second device, and a third device. During the first time period, based on the first location information, it may be determined that the first device was at the location (e.g., a meeting room) for a sufficiently long stationary duration, that the second device was at the location (e.g., the meeting room) for a sufficiently long stationary duration, and that the third device was at the location (e.g., the meeting room) for a sufficiently long stationary duration. The sufficiently long stationary duration may be the same or different for each of the devices. The sufficiently long stationary duration needs to be long enough to indicate that a device was stationary (i.e., a stationary episode) at the location (e.g., the meeting room).

Once computing device 500 determines that each of the first plurality of devices was stationary at the location based on the received first location information in stage 420, method 400 may continue to stage 430 where computing device 500 may determine a first estimated ground truth for each of the first plurality of devices at the location based on the first location information corresponding to each of the respective first plurality of devices at the location. For example, a centroid for each of the first device, the second device, and the third device, may be determined using the coordinates (e.g., (x,y) coordinates) gathered for the respective devices at the location during the sufficiently long stationary duration (i.e., from the received first location information). These determined centroids may respectively comprise an estimated ground truth or each of the first plurality of devices at the location.

Consistent with embodiments of the disclosure, if dependency on the actual (e.g., ground truth) location is eliminated, then the location accuracy process can be automated. Indoor positioning systems may leverage motion classification (e.g., stationary classification) to determine estimated ground truths to substitute the actual ground truths. For example, in a crowdsourced manner, a long duration of location estimates may be collected for a device that is present in the premises for several hours, without any user feedback or ground truth. Then, by applying motion classification (i.e., stationary detection) over the collected data, long durations of stationary episodes can be isolated. For each stationary episode, an estimated ground truth location can be determined as an aggregation (e.g., median or mean). Thus, no actual ground truth may need to be collected and this process may be applied to any devices tracked by an indoor positioning systems while maintaining anonymity. The estimated ground truth may be close to the real ground truth for such long stationary episodes.

After computing device 500 determines the first estimated ground truth for each of the first plurality of devices at the location based on the first location information corresponding to each of the respective first plurality of devices at the location in stage 430, method 400 may proceed to stage 440 where computing device 500 may determine a first plurality of location estimation errors for each of the first plurality of devices at the location respectively based on the first location information corresponding to each of the respective first plurality of devices at the location and the first estimated ground truth for each of the respective first plurality of devices at the location. For example, for each of the first plurality of devices, a Euclidean distance (e.g., error) may be determined between the estimated ground truth (e.g., the aforementioned centroid) and the coordinates (e.g., (x,y) coordinates) gathered for the respective devices at the location during the sufficiently long stationary duration (i.e., from the received first location information). These errors may be collected into a CDF for each of the first plurality of devices and may comprise the first plurality of location estimation errors.

From stage 440, where computing device 500 determines the first plurality of location estimation errors for each of the first plurality of devices at the location respectively based on the first location information corresponding to each of the respective first plurality of devices at the location and the first estimated ground truth for each of the respective first plurality of devices at the location, method 400 may advance to stage 450 where computing device 500 may aggregate each of the determined first plurality of location estimation errors for each of the first plurality of devices at the location to provide a first location accuracy measurement for the location. For example, each of the aforementioned CDFs for each of the first plurality of devices may be aggregated into one CDF that may comprise the first location accuracy measurement for the location.

In an indoor positioning system with thousands of mobile devices, over a duration of a single day or week, enough data may be collected such that good coverage of an entire floor map may be achieved. Consistent with embodiments of the disclosure, a location accuracy CDF determined using the estimated ground truth may be indicative of overall accuracy. Further, with multitude estimated ground truths across the floor map, a location accuracy heatmap can also be generated as a representation of spatial coverage of location accuracy. The consistency (accuracy over time) can be realized to check if the location accuracy (demonstrated with accuracy CDF and heatmap) is maintained over time.

Once computing device 500 aggregates each of the determined first plurality of location estimation errors for each of the first plurality of devices at the location to provide a first location accuracy measurement for the location in stage 450, method 400 may continue to stage 460 where computing device 500 may provide an alert when the first location accuracy measurement for the location is greater than a predetermined threshold. For example, an alert may be raised if the measured accuracy deteriorates beyond a certain threshold from the established deployment accuracy, and then troubleshooting efforts may be made to identify and rectify the cause. Embodiments of the disclosure may also point out the areas of bad accuracy that the troubleshooting efforts should focus on. Remediation of bad accuracy may require further investigation into the bad accuracy areas. The list of potential factors impacting or causing non-conformant accuracy are numerous and may vary by deployment due to factors such as varying floor plans, AP-AP distances and interference present in the environment. Any technical issue in the data flow from the APs to controller to the indoor positioning system may also cause bad accuracy.

The process described above with respect to stages 410 through 450 may be latter repeated to produce a second location accuracy measurement for the location. Then, the first location accuracy measurement for the location may be compared to the second location accuracy measurement for the location. An alert may be provided when the first location accuracy measurement for the location is different from the second location accuracy measurement for the location by greater than a predetermined threshold. Once computing device 500 provides the alert when the first location accuracy measurement for the location is greater than a predetermined threshold in stage 460, method 400 may then end at stage 470.

Figure 5:
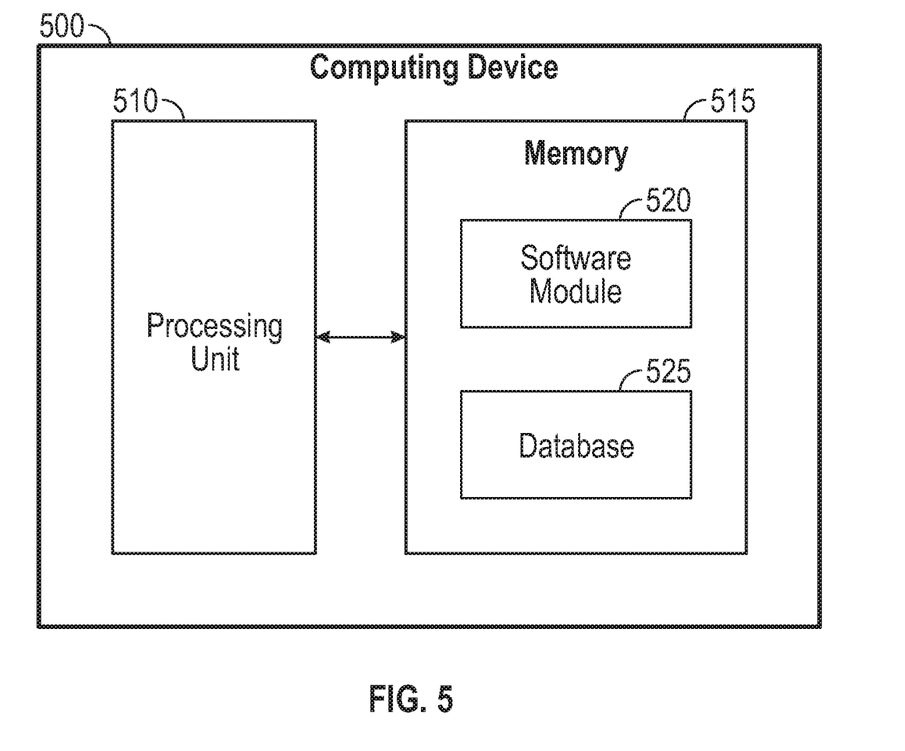
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing benchmarking and measurement of location accuracy using crowdsourced data, including for example, any one or more of the stages from method 400 described above with respect to FIG. 4.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multi-processor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a computing device, first location information corresponding to a first plurality of devices for a first time period;
   determining that each of the first plurality of devices was stationary at a location based on the received first location information;
   determining a first estimated ground truth for each of the first plurality of devices at the location based on the first location information corresponding to each of the respective first plurality of devices at the location;
   determining a first plurality of location estimation errors for each of the first plurality of devices at the location respectively based on the first location information corresponding to each of the respective first plurality of devices at the location and the first estimated ground truth for each of the respective first plurality of devices at the location;
   aggregating each of the determined first plurality of location estimation errors for each of the first plurality of devices at the location to provide a first location accuracy measurement for the location;
   receiving second location information corresponding to a second plurality of devices for a second time period;
   determining that each of the second plurality of devices was stationary at the location based on the received second location information;
   determining a second estimated ground truth for each of the second plurality of devices at the location based on the second location information corresponding to each of the respective second plurality of devices at the location;
   determining a second plurality of location estimation errors for each of the second plurality of devices at the location respectively based on the second location information corresponding to each of the respective second plurality of devices at the location and the second estimated ground truth for each of the respective second plurality of devices at the location;
   aggregating each of the determined second plurality of location estimation errors for each of the second plurality of devices at the location to provide a second location accuracy measurement for the location; and
   providing an alert when the first location accuracy measurement for the location is different from a second location accuracy measurement for the location by greater than the predetermined threshold.

2. The method of claim 1, further comprising providing another alert when the first location accuracy measurement for the location is greater than another predetermined threshold.

3. The method of claim 1, further comprising providing another alert when the first location accuracy measurement for the location is greater than another predetermined threshold and that a bias is high for the location.

4. The method of claim 3, further comprising adjusting access points (APs) in a wireless network covering the location to improve coverage of the location.

5. The method of claim 1, further comprising providing another alert when a bias is high for the location.

6. The method of claim 1, wherein determining the first plurality of location estimation errors for each of the first plurality of devices at the location respectively based on the first location information corresponding to each of the respective first plurality of devices at the location and the first estimated ground truth for each of the respective first plurality of devices at the location comprises determining an Euclidean distance between the first estimated ground truth and coordinates gathered for respective first plurality of devices at the location during the sufficiently long stationary duration.

7. A system comprising:
   a memory storage; and
   a processing unit coupled to the memory storage, wherein the processing unit is operative to:
   receive first location information corresponding to a first plurality of devices for a first time period;
   determine that each of the first plurality of devices was stationary at a location based on the received first location information;
   determine a first estimated ground truth for each of the first plurality of devices at the location based on the first location information corresponding to each of the respective first plurality of devices at the location;
   determine a first plurality of location estimation errors for each of the first plurality of devices at the location respectively based on the first location information corresponding to each of the respective first plurality of devices at the location and the first estimated ground truth for each of the respective first plurality of devices at the location;
   aggregate each of the determined first plurality of location estimation errors for each of the first plurality of devices at the location to provide a first location accuracy measurement for the location;
   receive second location information corresponding to a second plurality of devices for a second time period;
   determine that each of the second plurality of devices was stationary at the location based on the received second location information;
   determine a second estimated ground truth for each of the second plurality of devices at the location based on the second location information corresponding to each of the respective second plurality of devices at the location;
   determine a second plurality of location estimation errors for each of the second plurality of devices at the location respectively based on the second location information corresponding to each of the respective second plurality of devices at the location and the second estimated ground truth for each of the respective second plurality of devices at the location;
   aggregate each of the determined second plurality of location estimation errors for each of the second plurality of devices at the location to provide a second location accuracy measurement for the location; and
   provide an alert when the first location accuracy measurement for the location is different from the second location accuracy measurement for the location by greater than a predetermined threshold.

8. The system of claim 7, wherein the processing unit is further operative to provide another alert when the first location accuracy measurement for the location is greater than another predetermined threshold.

9. The system of claim 7, wherein the processing unit is further operative to provide another alert when the first location accuracy measurement for the location is greater than another predetermined threshold and that a bias is high for the location.

10. The system of claim 9, wherein the bias is determined based upon known locations of devices.

11. The system of claim 7, wherein the processing unit is further operative to provide another alert when a bias is high for the location.

12. The system of claim 9, wherein the processing unit is further operative to adjust access points (APs) in a wireless network covering the location to improve coverage of the location.

13. A non-transitory computer-readable medium that stores a set of instructions which when executed perform a method comprising:
receiving first location information corresponding to a first plurality of devices for a first time period;
determining that each of the first plurality of devices was stationary at a location based on the received first location information;
determining a first estimated ground truth for each of the first plurality of devices at the location based on the first location information corresponding to each of the respective first plurality of devices at the location;
determining a first plurality of location estimation errors for each of the first plurality of devices at the location respectively based on the first location information corresponding to each of the respective first plurality of devices at the location and the first estimated ground truth for each of the respective first plurality of devices at the location;
aggregating each of the determined first plurality of location estimation errors for each of the first plurality of devices at the location to provide a first location accuracy measurement for the location;
receiving second location information corresponding to a second plurality of devices for a second time period;
determining that each of the second plurality of devices was stationary at the location based on the received second location information;
determining a second estimated ground truth for each of the second plurality of devices at the location based on the second location information corresponding to each of the respective second plurality of devices at the location;
determining a second plurality of location estimation errors for each of the second plurality of devices at the location respectively based on the second location information corresponding to each of the respective second plurality of devices at the location and the second estimated ground truth for each of the respective second plurality of devices at the location;
aggregating each of the determined second plurality of location estimation errors for each of the second plurality of devices at the location to provide a second location accuracy measurement for the location; and
providing an alert when the first location accuracy measurement for the location is different from the second location accuracy measurement for the location by greater than a predetermined threshold.

14. The non-transitory computer-readable medium of claim 13, further comprising providing another alert when the first location accuracy measurement for the location is greater than another predetermined threshold.

15. The non-transitory computer-readable medium of claim 13, further comprising providing another alert when the first location accuracy measurement for the location is greater than another predetermined threshold and that a bias is high for the location.

16. The non-transitory computer-readable medium of claim 13, further comprising providing another alert when a bias is high for the location.

17. The non-transitory computer-readable medium of claim 15, further comprising adjusting access points (APs) in a wireless network covering the location to improve coverage of the location.

* * * * *